US006889281B2

United States Patent
Burns et al.

(10) Patent No.: US 6,889,281 B2
(45) Date of Patent: *May 3, 2005

(54) HOT-PLUG STORAGE DRIVE

(75) Inventors: Gregory E. Burns, The Woodlands, TX (US); Richard J. Palmer, The Woodlands, TX (US); Cynthia D. Mills, Pinehurst, TX (US); John H. Marino, Cypress, TX (US); David J. Burque, Beaverton, OR (US); William K. Miller, Colorado Springs, CO (US); Eric R. Edstrom, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/691,350

(22) Filed: Oct. 22, 2003

(65) Prior Publication Data

US 2004/0088457 A1 May 6, 2004

Related U.S. Application Data

(63) Continuation of application No. 09/630,246, filed on Jul. 31, 2000, now Pat. No. 6,665,763.

(51) Int. Cl.[7] ............................................. G06F 13/00
(52) U.S. Cl. ..................................................... 710/301
(58) Field of Search ................................ 710/107, 301, 710/302, 305; 326/30

(56) References Cited

U.S. PATENT DOCUMENTS

| 5,664,119 | A | | 9/1997 | Jeffries et al. |
| 5,940,629 | A | | 8/1999 | Rikukawa et al. |
| 6,108,740 | A | * | 8/2000 | Caldwell ..................... 710/305 |
| 6,177,807 | B1 | * | 1/2001 | Bertin et al. .................. 326/30 |
| 6,217,228 | B1 | | 4/2001 | Samela et al. |
| 6,460,098 | B1 | * | 10/2002 | Paul ............................ 710/62 |
| 6,480,925 | B1 | | 11/2002 | Bodo |
| 6,532,547 | B1 | | 3/2003 | Wilcox |
| 6,665,763 | B1 | * | 12/2003 | Burns et al. ................ 710/301 |

OTHER PUBLICATIONS

"Method for Card 'Hot Plug' Detection and Control," IBM Technical Disclosure Bulletin, vol. 35, No. 5 (Oct. 1992), pp. 391–394.

* cited by examiner

Primary Examiner—Glenn A. Auve

(57) ABSTRACT

A drive assembly includes a carrier, a drive supported by the carrier, and an interface board. The tape drive includes a bus connector and a power connector. A plurality of cables are coupled to the bus connector and the power connector. The interface board includes an expander coupled to the cables and an external connector coupled to the expander. A storage array includes a backplane, a plurality of storage devices coupled to the backplane, a bus coupled to the storage devices, and at least one input/output connector coupled to the bus. Each storage device includes a carrier, a drive supported by the carrier, and an interface board. The drive includes a bus connector and a power connector. A plurality of cables are coupled to the bus connector and the power connector. The interface board includes an expander coupled to the cables and an external connector coupled to the expander.

12 Claims, 6 Drawing Sheets

HOT-PLUG STORAGE DRIVE

This application is a continuation of U.S. Ser. No. 09/630,246 filed Jul. 31,2000, now U.S. Pat. No. 6,665,763.

BACKGROUND OF THE INVENTION

1. Field of the Invention

This invention relates generally to storage devices used in computer systems and, more particularly, to a hot-plug storage drive.

2. Description of the Related Art

Most types of electronic and computing systems comprise many different devices that electronically communicate with each other over one or more buses. Exemplary types of devices include, but are not limited to, processors (e.g., microprocessors, digital signal processors, and microcontrollers), memory devices (e.g., hard disk drives, floppy disk drives, and optical disk drives), and peripheral devices (e.g., keyboards, monitors, mice). When electrically connected to a bus, these types of devices, as well as others not listed, are all sometimes generically referred to as "bus devices."

A bus, in the conceptually simplest form, is a collection of wires over which the various electronic devices in a piece of electronic or computing equipment transmit information. However, any given bus may be implemented in many different ways. A bus may be implemented so as to transmit only data, or only commands, or both data and commands, for instance. But many more permutations are available based on other operating characteristics, such as bus width and bus speed. These two characteristics are exemplary only, and many other characteristics not listed are considered in designing any particular bus implementation. Occasionally, an industry group will formalize a set of operating characteristics into a "standard." The standard will set flexible definitions for the standard that permit some variation in design but generally ensure compatibility for designs meeting the standard.

One such bus standard is the Small Computer System Interface standard ("SCSI", pronounced "scuzzy"). There are actually many different kinds of SCSI implementations, each defined by a different SCSI standard. More particularly, at least the following varieties of SCSI are currently implemented: SCSI-1, SCSI-2, Wide SCSI, Fast SCSI, Fast Wide SCSI, Ultra SCSI, SCSI-3, Ultra Wide SCSI, Ultra2 SCSI, Fibre Channel, and Wide Ultra2 SCSI as well as some buses utilizing optical interconnections. The various SCSI standards are not necessarily compatible with each other, although the basic SCSI standards (SCSI-1, SCSI-2, and SCSI-3) are basically functionally compatible.

Generally, SCSI began as a parallel interface standard used by Apple Macintosh computers, PCs, and many UNIX systems for attaching peripheral devices to computers. The original intent was to develop an interface providing faster data transmission rates (up to 80 megabytes per second) than the standard serial and parallel ports found on computers of the time. However, the SCSI standards proved to be enormously more useful than this original intent. One distinct advantage to the SCSI interface was that it permitted a user to attach many devices to a single SCSI port in a daisy chain fashion. At the time, conventional serial and parallel ports generally were limited to one device per port.

The versatility inherent in the SCSI standards has allowed the interface to be adapted to large scale computing environments, including networks, both local area networks ("LANs") and wide area networks ("WANs"). One large scale computing application is the implementation of storage arrays that use a plurality of storage devices, such as disk drives or tape drives, that are grouped into arrays to provide centralized storage and backup capabilities. Some disk arrays are configured for bulk storage, while other configurations, such as Redundant Arrays of Inexpensive Disks (RAID) and Redundant Arrays of Inexpensive Tapes (RAIT), provide data redundancy to allow recovery in the event of a storage device failure. The SCSI configuration allows multiple devices in the array to be simultaneously accessed, thus allowing increased transfer rates.

Typically, the setup of a SCSI system is complicated and requires a high level of expertise on the part of the user. For example, a SCSI bus arrangement is typically arranged in a daisy chain fashion, where one device interconnects with the adjacent devices on the bus. Both ends of the bus must be terminated (i.e., bus lines are pulled high) to allow for proper transmission line characteristics and minimize reflections at the ends of the bus. Improper termination, such as failure to terminate or terminating at places other than the ends of the bus, may reduce the robustness of the bus and even prevent its operation entirely.

To address the difficulties associated with configuring SCSI storage arrays, computer system vendors typically provide external storage arrays with fixed configurations. Additional unused slots may be provided for adding storage capacity. The bus configuration, however, is fixed. If a user has several servers and wishes to provide separate storage arrays for each, separate external storage arrays must be purchased and installed. Some storage arrays may be pre-configured to provide two or more independent banks to allow separate arrays in a common housing. However, these configurations are still static. One application might require a relatively small storage array while another might require a larger array. A user may either need to purchase either a multi-array unit with a large capacity or two separate units with capacity appropriate for the application. Either solution may not be cost-effective.

One current trend in the storage device area is to provide hot-plug capabilities for the devices. A hot-plug drive can be replaced without powering down the system. Currently, the SCSI standards define a hot-plug interface port standard and an accompanying single connector attachment (SCA) connector for coupling hot-plug devices to common bus. If a drive fails, it may be removed and replaced. If a RAID data storage arrangement is used the data on the original drive may also be reconstructed. An SCA connector combines the bus, power, and SCSI ID connectors into a single attachment. Mechanical features of the SCA connector control the removal and application of power to the hot-plug device upon disengagement and engagement of the connector.

While SCA connectors have been used to standardize hot-plug hard disk drives, tape drives have not been provided with a similar standardization. Current hot-plug tape drives have been developed with specialized connectors that are compatible only with specific products. In one such implementation, the power connection is provided with hot-plug capability while the other connections remain unchanged. Such devices cannot be interconnected on a common bus with other hot-plug devices due to signal integrity and bus citizenship problems resulting from the cable arrangement. For example, the additional cabling required to connect the standard connectors to the bus adds undesirable capacitance and has the potential to disrupt the transmission line characteristics of the SCSI bus, rendering it unreliable or inoperative.

The present invention is directed to overcoming, or at least reducing the effects of, one or more of the problems set forth above.

SUMMARY OF THE INVENTION

One aspect of the present invention is seen in a drive assembly including a carrier, a drive supported by the carrier, and an interface board. The tape drive includes a bus connector and a power connector. A plurality of cables are coupled to the bus connector and the power connector. The interface board includes an expander coupled to the cables and an external connector coupled to the expander.

Another aspect of the present invention is seen in a storage array including a backplane, a plurality of storage devices coupled to the backplane, a bus coupled to the storage devices, and at least one input/output connector coupled to the bus. Each storage device includes a carrier, a drive supported by the carrier, and an interface board. The drive includes a bus connector and a power connector. A plurality of cables are coupled to the bus connector and the power connector. The interface board includes an expander coupled to the cables and an external connector coupled to the expander.

BRIEF DESCRIPTION OF THE DRAWINGS

The invention may be understood by reference to the following description taken in conjunction with the accompanying drawings, in which like reference numerals identify like elements, and in which.

Figure 1:
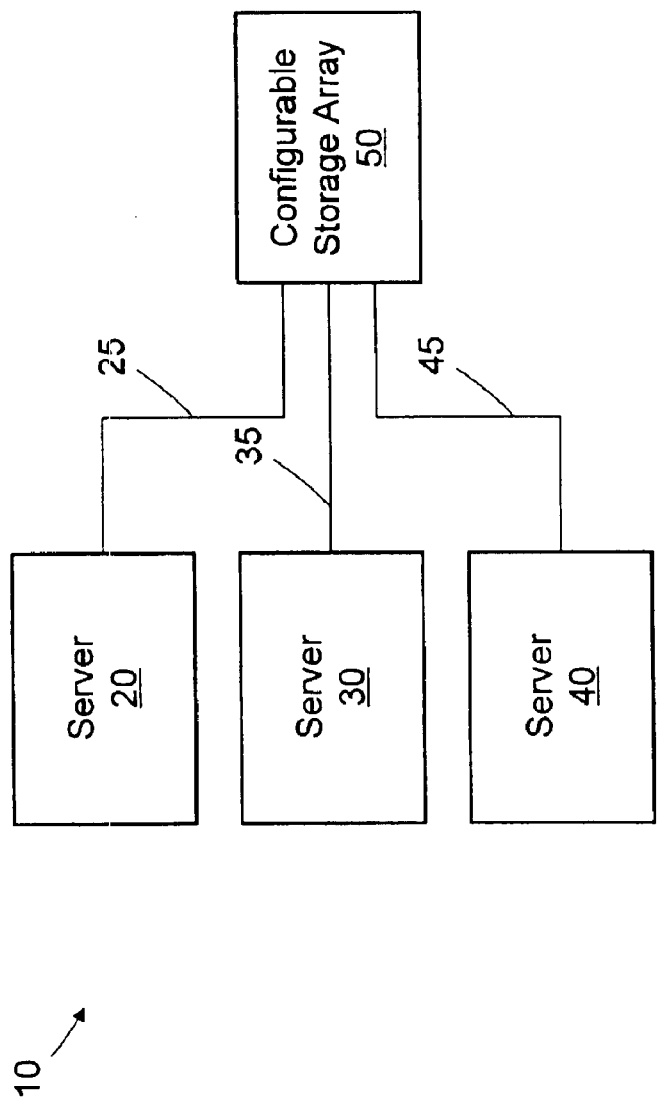
FIG. 1 is a simplified block diagram of a computer system including a configurable storage array in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the Figures, and first, to FIG. 1, a simplified block diagram of a computer system 10 is provided. The computer system 10 includes a plurality of servers 20, 30, 40 coupled to a configurable storage array 50 by external cables 25, 35, 45, respectively. The number of servers 20, 30, 40 depicted in FIG. 1 is chosen for illustrative purposes only. Only one server 20 may be employed, or an even greater number of servers may be employed, depending on the specific implementation and the connection capacity of the configurable storage array 50. In the illustrated embodiment, the servers 20, 30, 40 are adapted to interface with the configurable storage array 50 in accordance with a SCSI protocol, such as ANSI X3T10-1142. However, the application of the instant invention is not limited to a particular bus topology, and the teachings herein may be adapted to other current and future bus protocols. The configurable storage array 50 is adapted to segment its internal bus and group its individual storage devices into sub-arrays depending on the particular manner in which the cables 25, 35, 45 from the servers 20, 30, 40 are connected to the configurable storage array 50, as discussed in greater detail below.

Figure 2A:
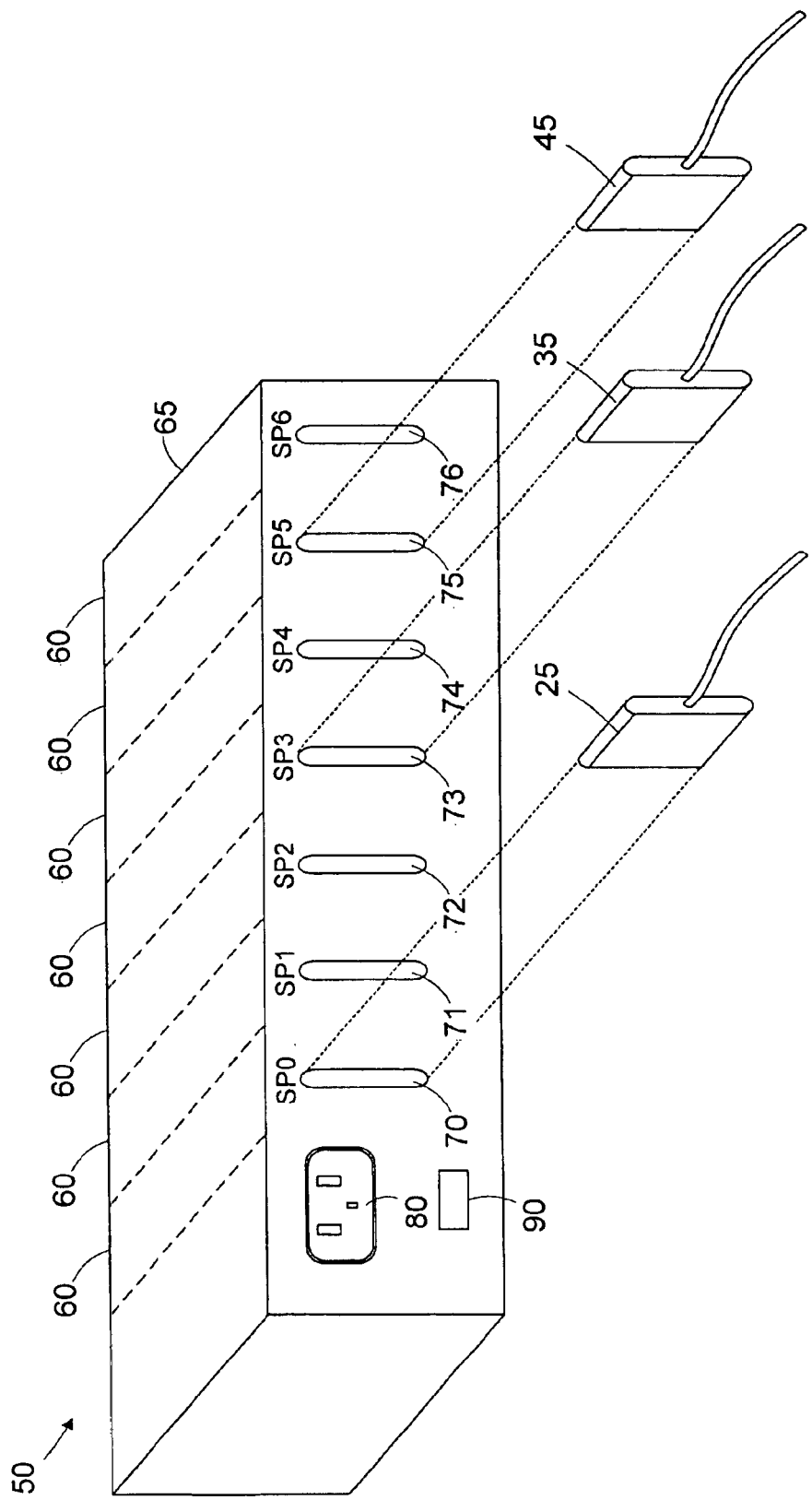
FIGS. 2A and 2B are isometric views of alternative embodiments of the configurable storage array of FIG. 1.
Figure 2B:
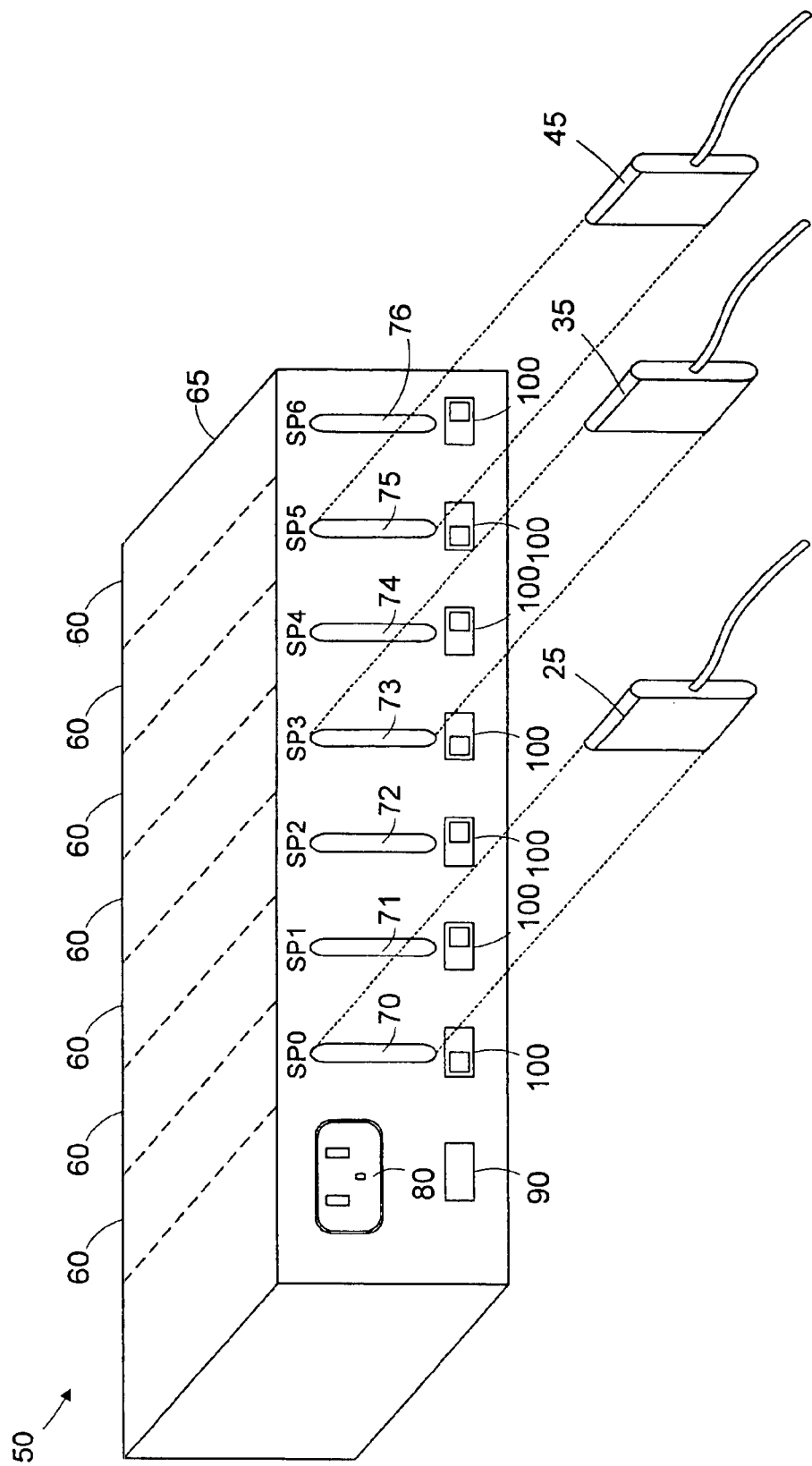

Turning now to FIGS. 2A and 2B, isometric views of various embodiments of the configurable storage array 50 of FIG. 1 are provided. The configurable storage array 50 includes a plurality of storage units 60, such as tape drives or disk drives, contained in a housing 65. The particular number of storage units 60 included in the configurable storage array 50 may vary depending on the specific implementation. In the illustrated embodiment, the storage units 60 are hot-plug enabled, in that they may be removed and replaced without requiring that the configurable storage array 50 be powered down. A particular hot-plug tape drive assembly suitable for use in this application is described in greater detail below in reference to FIGS. 4 and 5.

A plurality of external input/output (I/O) connectors 70–76 are provided for connecting other devices, such as the servers 20, 30, 40 to the configurable storage array 50. A power connector 80 is also provided for supplying the configurable storage array 50. During a configuration cycle, the configurable storage array 50 determines which particular I/O connectors 70–76 have connections made thereto and groups the storage units 60 into separate arrays based on such connections. The configuration cycle may be performed when the configurable storage array 50 is first powered up, or alternatively, the configuration cycle may be triggered in response to a user depressing a reconfigure switch 90 on the configurable storage array 50.

In the embodiment depicted in FIG. 2A, the configurable storage array 50 is adapted to automatically detect the desired array configurations based on the connections. Alternatively, in the second embodiment illustrated in FIG. 2B, manual switches 100 are provided for defining the array configurations. The manner in which the separate arrays are configured based on either the particular connections or the positions of the switches 100 is described in greater detail below.

Figure 3:
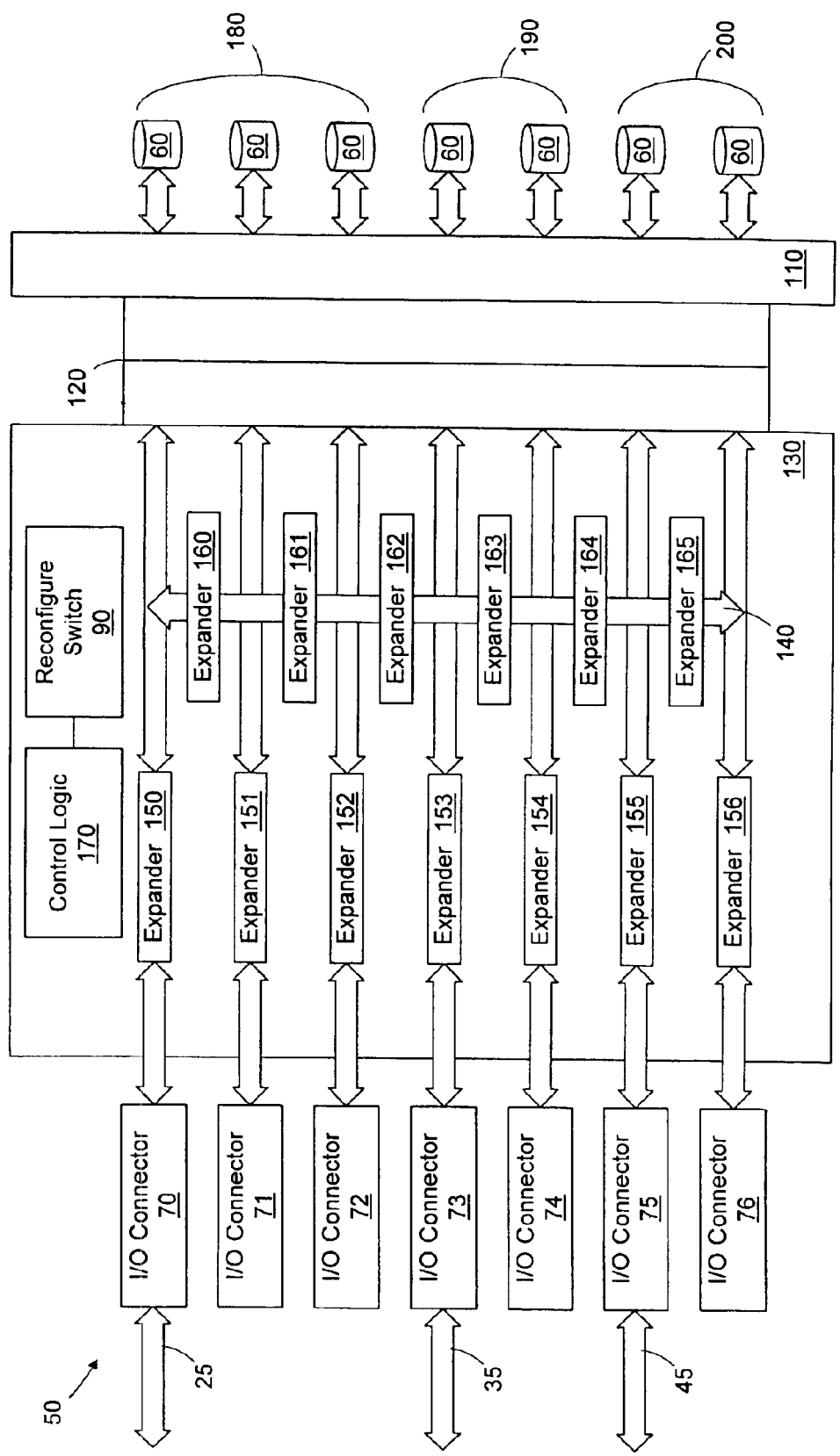
FIG. 3 is a simplified block diagram illustrating the operation of the configurable storage array of FIG. 1.

Referring now to FIG. 3 a simplified block diagram illustrating the operation of the configurable storage array 50 is provided. The storage units 60 are coupled to a backplane 110, which is in turn connected through a connector 120, to a control board 130. The backplane 110 supports hot-plug operability. Mechanical features on the connections from the storage devices 60 to the backplane 110 allow the backplane 110 to determine if the storage device 60 is being inserted or removed. The backplane 110 regulates power to the storage devices 60 as appropriate during the transitions. The particular construct and operation of a hot-plug backplane, such as the backplane 110, are well-known to those or ordinary skill in the art, and as such, specific details are not included herein for clarity and ease of illustration.

A segmentable bus 140 is provided for grouping the various storage units 60 into arrays. Expanders 150–156 are provided for interfacing with the I/O connectors 70–76. One characteristic of a SCSI implementation is that any connections, commonly referred to as stubs, extending from the main bus be no more that 0.1 m in length (i.e., including internal wiring). The expanders 150–156 function to control the stub length and also perform a signal conditioning function on the signals communicated through the I/O connectors 70–76. Expanders 160–165 are provided for segmenting the bus 140 depending on the particular array configurations. In the illustrated embodiment, the expanders 150–156 are always enabled, and the expanders 160–165 are selectively enabled. Suitable devices for implementing the expanders 150–165 are an A 53C140 or an 53C180 ASIC sold by LSI Logic Corporation. Control logic 170 interfaces with the various expanders, 160–165 for configuring the arrays. A suitable device for implementing the control logic 170 is a complex programmable logic device (CPLD), such as a CY37064 offered by Cypress Semiconductor Corporation. As will be appreciated by those of ordinary skill in the art, appropriate bus terminators (not shown) are provided to comply with SCSI requirements that the bus be terminated at both ends. For example, bus terminators (not shown) would be placed between the expanders 150–156 and the I/O connectors 70–76. Bus terminators (not shown) would also be placed between the expanders 150–156 and the storage devices 60, either on the control board 130 or on the backplane 110.

During a configuration cycle, the control logic 170 determines which of the I/O connectors 70–76 have cables 25, 35, 45 attached thereto and groups the storage units 60 into arrays depending on the connection arrangement. The control logic 170 may automatically sense the arrangement, or the user may program the arrangement using the switches 100 by activating the switches 100 corresponding to the I/O connectors 70–76 with connections made thereto. One technique for sensing the presence of a connection involves employing one of the unused ground lines on the bus. In the control board 130 the line is tied to a voltage source (e.g., 5 volts). If no connection is made, the voltage on the line will remain at the predetermined voltage level. However, if a connection is present, the voltage will be pulled to ground. Using such a technique, the control logic 170 can readily determine which I/O connectors 70–76 have connections made thereto. The control logic 170 starts a new drive array at each connection point, as illustrated by the following examples. During the configuration cycle, the control logic 170 also configures the SCSI Ids of the storage units 60 on the drive arrays. In the illustrated embodiment, the control logic 170 sets the SCSI Id of the first storage device in each array to 0 and increments for the additional storage devices 160 in the array.

If a connection is made at the I/O connector 70, and no other connections are made, the control logic configures all of the storage units 60 on a common bus by enabling all of the expanders 160–165. In such a configuration, the segmentable bus 140 appears as a single bus with all of the storage devices 60 coupled thereto. If connections are made to all of the I/O connectors 70–76, all of the expanders 160–165 will be disabled, resulting in one storage device 60 being assigned per connection. If the first connection were made to one of the I/O connectors 71–76 other than the first I/O connector 70, the expanders 160–165 before the first connection would be disabled, leaving the associated storage devices unused. In such a case the expanders 150–156 associated with the unused storage devices 160 may be disabled by the control logic 170 to prevent later connection to an improperly configured array.

Differing size storage arrays may be constructed based on the particular arrangement of connections to the I/O connectors 70–76. Consider the case illustrated in FIGS. 3A and 3B where a connection is made to the first, fourth, and sixth I/O connectors 70, 73, 75. The expanders 160, 161 are enabled by the control logic 170 to define a first isolated bus segment 180 in the bus 140 including the first three storage devices 60. The segment is isolated by disabling the expander 162. To define a second isolated bus segment 190 in the bus 140, the control logic 170 enables the expander 163 and disables the expander 164. Finally, the expander 165 is enabled to define a third isolated bus segment 200 in the bus 140.

After the configuration cycle is completed, i.e., after power up or pressing of the reconfigure switch 90, additional connections to the previously unused I/O connectors 70–76 may be made. These additional connections do not cause a reconfiguration of the arrays. Multiple cable attachment to the same logical isolated bus segment allows the configurable storage array 50 to support multiple-initiator transactions as defined by the appropriate SCSI standards. The disabled expander 160–165 located at the start of an isolated bus segment 190, 200 may be referred to as being upstream of the connection to the I/O connector 70–76, and the expanders 160–165 that are enabled to form the isolated bus segments 180, 190, 200 may be referred to as being downstream of the connection to the I/O connector 70–76.

Thus, by way of example and illustration, the expanders 150–156, 160–165, control logic 170, and switches 100 (i.e., in the embodiment of FIG. 2B) comprise means for determining an arrangement of connectors coupled to input/output connectors of the configuring a storage array and means for grouping subsets of the storage devices onto isolated bus segments in the storage array based on the arrangement of connectors.

Figure 4:
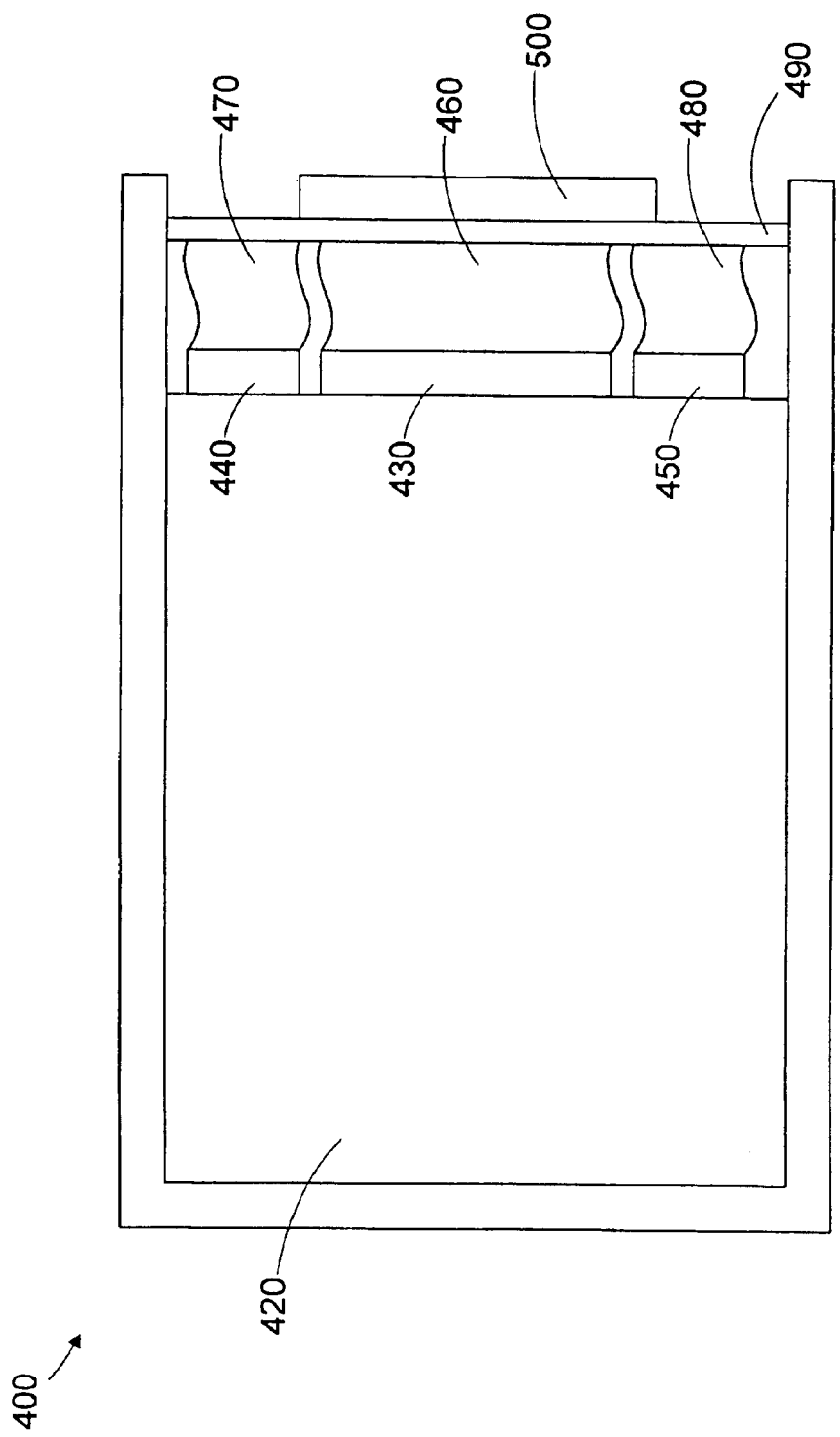
FIG. 4 is a simplified top view of a hot-plug drive assembly for use in the configurable storage array of FIG. 1 with the top portion of the carrier removed.

Turning now to FIG. 4, a simplified diagram of a hot-plug drive assembly 400 suitable for use as one of the storage devices 60 in the configurable storage array 50 of FIG. 1 in accordance with another embodiment of the present invention is provided. The hot-plug drive assembly 400 includes a carrier 410 adapted to support a drive 420. In the illustrated embodiment, the drive 420 is a tape drive, however, the invention is not so limited, as other types of drives (e.g., hard disk drive) may be used. For example, a standard non-hot-plug disk drive may be provided with hot plug capability in accordance with the teachings herein. In the case where the drive 420 is a tape drive, a number of commonly available industry standard tape drives, such as an SDX500C or an SDT 11000 offered by Sony, may be used. The drive 420 includes a bus connector 430, such as a typical 50 or 68 pin SCSI connector, a power connector 440, and an Id connector 450 (e.g., SCSI Id). These connectors 430, 440, 450 are industry standard connectors commonly found on non-hot-plug drives. The connectors are coupled by cables 460, 470, 480 to an interface board 490 also supported by the carrier 410. An SCA connector 500 is mounted to the interface board 490 for providing an industry standard hot-plug interface. In the illustrated embodiment, the connectors 430, 440, 450 are SCSI connectors, however, the invention is not so limited as other bus topologies may be used. For example, other bus topologies may not include a distinct Id connector 450. The specific construction and operation of the interface board 490 is described in greater detail below.

Figure 5:
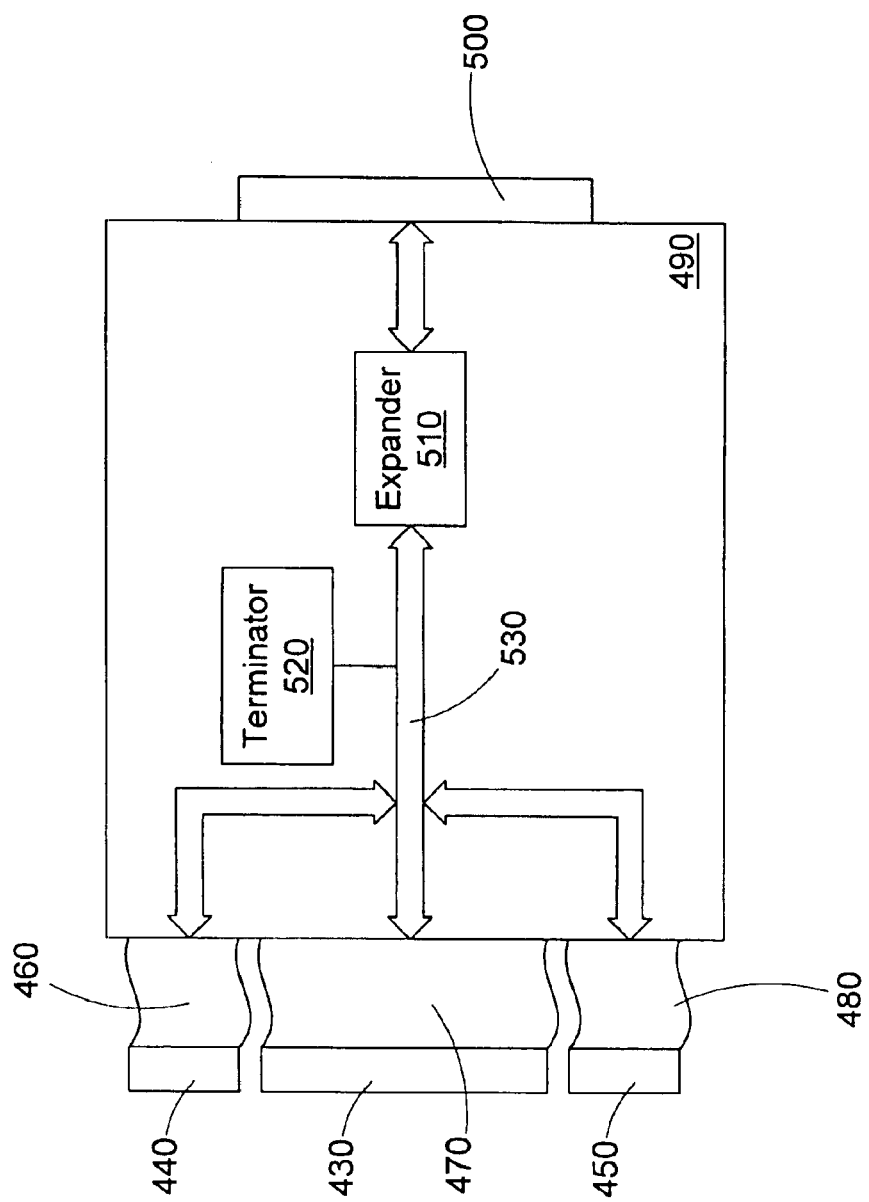
FIG. 5 is a block diagram of the tape drive of FIG. 4.

Referring to FIG. 5, a block diagram of the hot-plug drive assembly 400 illustrating the operation of the interface board 490 is shown. The interface board 490 includes an expander 510 and a terminator 520. The individual lines 530 from the cables 460, 470, 480 that originate from the bus connector 430, power connector 440, and Id connector 450 of the tape drive 420 are routed to the expander 510. A suitable device for implementing the expander 510 is an A 53C140 or an 53C180 ASIC sold by LSI Logic Corporation. The terminator 520 is coupled across the lines 530 to comply with the SCSI bus rule that both ends of a SCSI bus must be terminated. A suitable terminator 520 is a set of UCC5638L IC's offered by Unitrode/Texas Instruments. The output of the expander 510 is routed to the SCA connector 500.

The expander 510 minimizes the length of the stub seen at the SCA connector 500 and cleans up the capacitance characteristics of the hot-plug drive assembly 400. The interface board 490 thereby improves signal integrity and ensures proper bus citizenship while allowing the conversion from standard SCSI connections to an SCA connection. The hot-plug drive assembly 400 may be inserted into any hot-plug SCA connection along with other hot-plug devices, such as hard disk drives, cd-rom drives, etc.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A drive assembly adapted to be coupled to a bus having a variable stub length, comprising:
   a drive;
   a plurality of cables coupled to the drive;
   an interface board, comprising:
     at least one expander coupled to the cables; and
     an external connector coupled to the expander,
     wherein the external connector provides signals to and receives signals from the drive and wherein the expander performs signal conditioning on signals communicated through the external connector and controls the stub length of the bus.

2. The drive assembly according to claim 1 wherein the signal conditioning mitigates line transmissions, line capacitance, and periodic variations in voltage and temperature in the drive.

3. The drive assembly according to claim 1 wherein the expander is selectively enabled.

4. The drive assembly according to claim 1, the interface board further comprising a control logic device.

5. The drive assembly according to claim 4 wherein the control logic device is connected to the expander.

6. The drive assembly according to claim 1, the interface board further including at least one bus terminator.

7. The drive assembly according to claim 6, wherein the bus terminator is located between the expander and external connector.

8. The drive assembly of claim 1, wherein the drive comprises an Id connector, and the plurality of cables comprises a cable coupled to the Id connector.

9. The drive assembly of claim 1, wherein the interface board further comprises a terminator coupled between the cables and the expander.

10. The drive assembly of claim 1 further comprising a bus connector, wherein the bus connector comprises at least one of a 50-pin and a 68-pin small computer system interface (SCSI) connector.

11. The drive assembly of claim 1, wherein the external connector comprises a single connector attachment (SCA) connector.

12. The drive assembly of claim 1, wherein the drive comprises one of a tape drive and a hard disk drive.

* * * * *